US008050799B2

(12) United States Patent

Eickmeyer et al.

(10) Patent No.: US 8,050,799 B2
(45) Date of Patent: Nov. 1, 2011

(54) METHOD FOR DETERMINATION OF SPRAYING PARAMETERS FOR CONTROLLING A PAINTING APPLIANCE WHICH USES SPRAYING MEANS

(75) Inventors: Dietmar Eickmeyer, Heddeshaim (DE); Gunter Boerner, Sinsheim-Eschelbach (DE)

(73) Assignee: ABB Patent GmbH, Ladenburg (DE)

( * ) Notice: Subject to any disclaimer, the term of this patent is extended or adjusted under 35 U.S.C. 154(b) by 1016 days.

(21) Appl. No.: 11/942,046

(22) Filed: Nov. 19, 2007

(65) Prior Publication Data

US 2008/0125909 A1 May 29, 2008

(30) Foreign Application Priority Data

Nov. 28, 2006 (DE) ........................ 10 2006 056 446
Mar. 31, 2007 (DE) ........................ 10 2007 015 684
Jun. 4, 2007 (DE) ........................ 10 2007 026 041

(51) Int. Cl.
*G05B 19/18* (2006.01)

(52) U.S. Cl. .......... 700/250; 118/64; 118/314; 118/315; 118/316; 118/323; 427/180; 427/324; 427/393.5; 427/412.1; 427/424; 156/231; 156/238; 156/245; 156/280; 156/289; 34/69; 428/31

(58) Field of Classification Search .................. 118/315, 118/316, 323, 326, 64, 314, 631, 681, 624, 118/696; 427/180, 324, 393.5, 412.1, 424, 427/426, 427.2, 427.3, 475, 483, 485, 486; 156/231, 238, 245, 280, 289, 230; 34/270, 34/666; 239/69, 703; 428/31; 700/250
See application file for complete search history.

(56) References Cited

U.S. PATENT DOCUMENTS

| | | | | |
|---|---|---|---|---|
| 4,593,360 | A * | 6/1986 | Cocks | 700/123 |
| 4,614,300 | A * | 9/1986 | Falcoff | 239/71 |
| 4,957,782 | A * | 9/1990 | Medler et al. | 427/427.2 |
| 5,103,761 | A * | 4/1992 | Ishibashi et al. | 118/323 |
| 5,184,051 | A * | 2/1993 | Schweiker et al. | 318/568.1 |
| 6,348,232 | B1 * | 2/2002 | Chida et al. | 427/8 |
| 6,757,586 | B2 * | 6/2004 | Milojevic et al. | 700/245 |
| 6,804,579 | B1 * | 10/2004 | Laski | 700/245 |
| 6,815,012 | B2 * | 11/2004 | Baumann et al. | 427/447 |
| 6,836,700 | B2 * | 12/2004 | Greene et al. | 700/245 |
| 7,039,500 | B2 * | 5/2006 | Milojevic et al. | 700/245 |
| 7,194,334 | B2 * | 3/2007 | Laski | 700/245 |
| 7,321,807 | B2 * | 1/2008 | Laski | 700/245 |
| 7,399,363 | B2 * | 7/2008 | Clifford et al. | 118/323 |
| 7,638,000 | B2 * | 12/2009 | Clifford et al. | 118/323 |
| 2006/0190110 | A1 * | 8/2006 | Holt et al. | 700/96 |
| 2007/0289358 | A1 * | 12/2007 | Eickmeyer et al. | 73/1.36 |
| 2008/0125909 | A1 * | 5/2008 | Eickmeyer et al. | 700/250 |

* cited by examiner

*Primary Examiner* — James Trammell
*Assistant Examiner* — Marc McDieunel
(74) *Attorney, Agent, or Firm* — Buchanan Ingersoll & Rooney PC

(57) ABSTRACT

A method for determining of spraying parameters for controlling a painting appliance which sprays and is moved over an area to be painted, in particular a robot with a painting application. A known spraying map is produced, using known spraying parameters and paint amount, for a predetermined movement speed of the painting appliance, and a paint amount is matched to a new movement speed in comparison to the predetermined movement speed. Furthermore, new spraying parameters are calculated for the adapted paint amount, while maintaining a spraying map which is similar to the known spraying map.

19 Claims, 3 Drawing Sheets

50

10

METHOD FOR DETERMINATION OF SPRAYING PARAMETERS FOR CONTROLLING A PAINTING APPLIANCE WHICH USES SPRAYING MEANS

RELATED APPLICATIONS

This application claims priority under 35 U.S.C. §119 to German Application No. 10 2007 026 041.7 filed in Germany on 4 Jun. 2007, German Application No. 10 2007 015 684.9 filed in Germany on 31 Mar. 2007, and German Application No. 10 2006 056 446.4 filed in Germany on 28 Nov. 2006, the entire contents of which are hereby incorporated by reference in their entireties.

TECHNICAL FIELD

A method for determining of spraying parameters is disclosed for controlling a painting appliance which uses spraying means and is moved over an area to be painted, in particular a robot with a painting application.

BACKGROUND INFORMATION

It is generally known that, for industrial painting purposes, painting appliances, in particular paint atomizers, such as high-rotation-speed atomizers or air atomizers, are mounted on manipulators, in particular robots, and carry out a movement over the object to be painted, with the paint atomizer switched on, during the painting process. The aim of a painting process is to cover the object to be painted with paint as homogeneously as possible with a desired coating thickness. If the coating thickness is not homogeneous, there is a danger of visual defects or the risk of paint runs or popping marks on the object to be painted. This should be avoided, for quality reasons.

The paint atomizers are frequently moved in meandering paths over the object to be painted in order in this way to cover the entire surface with paint, gradually.

The requirement in this case is for ever higher paint atomizer movement speeds in order to complete the painting process as quickly as possible On the other hand, the paint atomizer speed at the turning points is virtually zero, so that the atomization conditions at the paint atomizer can likewise be matched to this change in the movement speed.

Until now, this adaptation of the outlet-flow rate of paint material, particularly in the area of the turning points, has been achieved by reducing the amount of paint material, or by switching off the atomizer completely at times. In order to reduce the amount of paint material, additional switching points are defined on the movement path during the programming phase, at which, when these switching points are reached, a change is made to a spraying parameter set for the painting appliance corresponding to the new movement speed. Until now, a parameter set such as this has been determined in advance by experiments on a case-by-case basis, and has been available to the painting system in a so-called brush table. A parameter set such as this covers a specific speed range of the painting appliance since the mathematical relationship between the movement speed and the outlet flow rate is not linear.

SUMMARY

A method for determination of spraying parameters is disclosed for controlling a painting appliance which use spraying means, which method makes it easier to find the spraying parameters.

This object is achieved by the method for determination of spraying parameters for controlling a painting appliance which uses a spray mist and is moved over a surface to be painted.

The method according to the disclosure for determination of spraying parameters for controlling a painting appliance which uses spraying means and is moved over a surface to be painted, in particular a robot with a painting application, accordingly comprises the following method steps. A known spraying map is produced, with known spraying parameters and paint amount for a predetermined movement speed of the painting appliance. A paint amount is matched to a new movement speed in comparison to the predetermined movement speed. Furthermore, new spraying parameters are calculated for the adapted paint amount, while maintaining a spray map which is similar to the known spraying map.

This means that there is no need whatsoever for the experiments that were previously required to determine a parameter set. Furthermore, the spraying parameters can be calculated for any desired speed or speed change so that, if this should be necessary at all, the speed ranges for a parameter set for controlling a spraying means can be chosen to be appropriately narrower. The painting result is correspondingly improved.

BRIEF DESCRIPTION OF THE DRAWINGS

The disclosure, its advantages as well as further improvements of the disclosure will be explained and described in more detail with reference to the exemplary embodiments which are illustrated in the drawings, in which.

DETAILED DESCRIPTION

Figure 1:
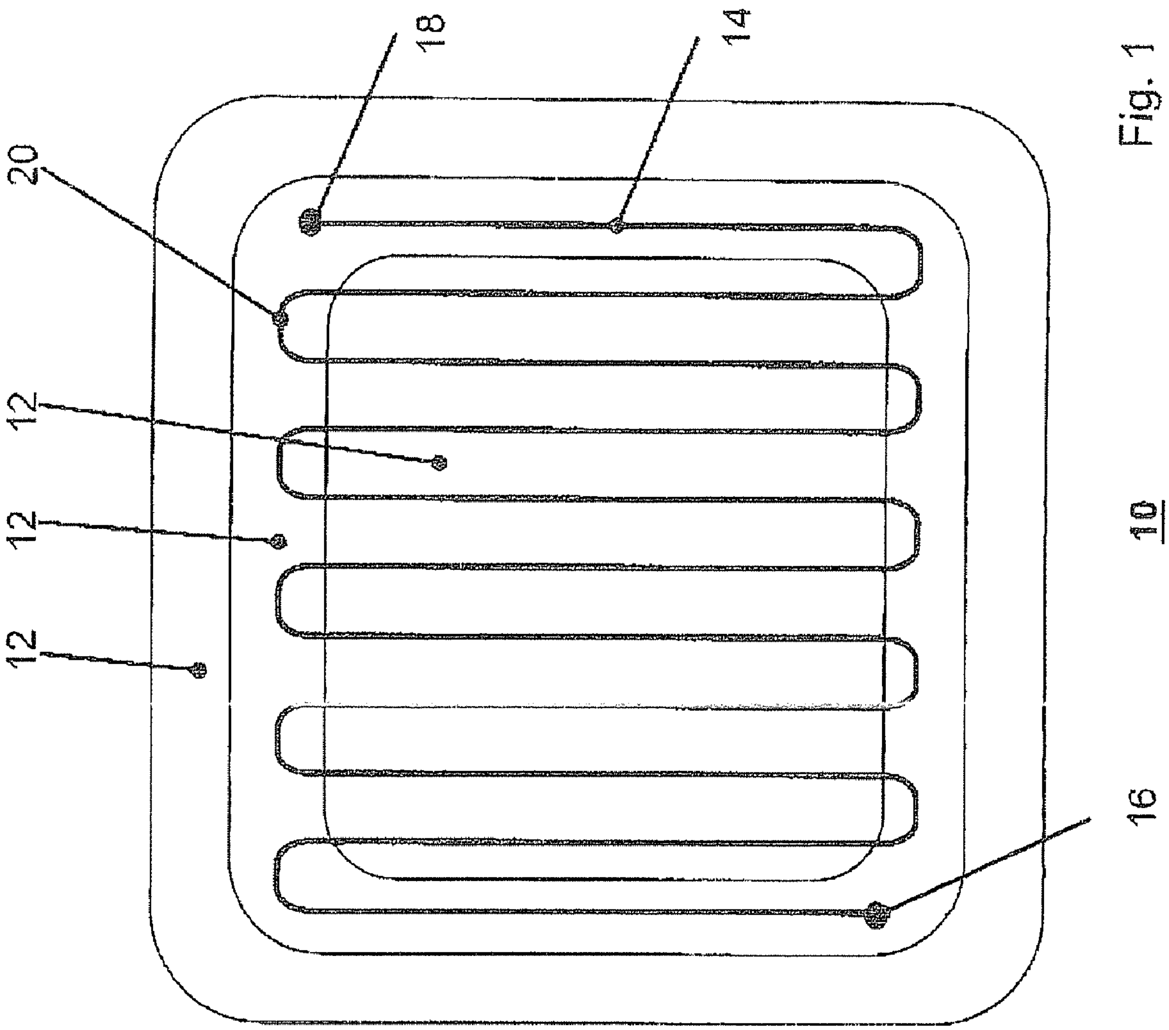
FIG. 1 shows an illustration of a coating thickness distribution.

A development of the method according to the disclosure is characterized in that a provisional spraying map is calculated on the basis of the known spraying map using the known spraying parameters and new paint amounts, in that the known spraying parameters are varied in order to obtain changed spraying parameters which result in a further spraying map, in that the changed spraying parameters are varied until the further spraying map is similar to the known spraying map within a similarity criterion, and in that the changed spraying parameters which are similar to the known spraying map are provided as new spraying parameters.

This allows the new spraying parameters to be calculated particularly easily, using a similarity aspect of the spraying maps. The implementation, the form of the similarity criterion or the detail of how the new spraying parameters can be obtained are already known. Further details relating to how similar spraying maps are found are already known to those skilled in the art.

Furthermore, one exemplary refinement of the method according to the disclosure provides that the spraying parameters cover the control of a plurality of air flows which influence the spraying behaviour of the painting appliance.

This allows additional parameters to be included in order to control, for example, a guidance airflow or a boundary airflow. The painting process is more effective overall, and, in addition, the method is improved overall.

Furthermore, the disclosure provides that the known spraying parameters are used in the event of any discrepancies between the new movement speed and the predetermined movement speed which result in a provisional spraying map which is similar within the similarity criterion.

This allows the computation complexity for calculation of the spraying parameters to be limited particularly easily. If the painting results show that the painting quality satisfies the quality requirements within a specific movement speed range, the similarity criterion is used to determine the range in which the existing or currently used spraying parameters will be used. If this range is exceeded in either direction, the spraying parameters are appropriately recalculated, and the parameter set accordingly changed.

The new spraying parameters can be calculated during operation of the painting appliance and before changing the predetermined movement speed.

This can be done either by the robot controller itself or else by an external computer, which then makes the calculated data available to the robot controller. In this exemplary embodiment the spraying parameters are calculated sufficiently quickly that they are calculated immediately before a change is made to the movement speed without having to make a file or table available for this purpose to the system before carrying out the movement program. It is, of course, also within the scope of the disclosure for the spraying parameters to be calculated first of all, before operation of the robot starts. This data relating to the spraying parameters is then collected, and if appropriate stored, in a so-called "look-up" table, for example for all variants of all spraying conditions (brusher).

The look-up table is made available to the robot controller so that no additional calculation is required before a change in the spraying parameters and, instead, the data is taken from the look-up table. FIG. 1 shows a map 10 as a plan view of a painted surface, showing different paint coating thicknesses by means of different areas 12. In this case, this illustration may be coloured, or may be represented by range boundaries in the form of lines. Furthermore, the figure also shows a meandering line 14, which represents a movement path of a painting application on a robot arm. In this case, the painting was started at a start point 16 and was moved by means of backwards and forwards movements, with a forward feed at right angles to the backwards and forwards movement, at the respective start and end of each forwards and backwards movement, gradually over the previously determined area, so that the painting application finally arrives at an end point 18.

This figure is intended to show the various speeds and accelerations during a painted movement. First of all, the painting application can be accelerated, from rest, starting from the start point 16, to a constant working speed in order to achieve a uniform painting result. Towards the end of the movement, the speed decreases in the extreme to approximately 0 at one point on the movement path of the painting application, in order to accelerate to the predetermined nominal speed again, in the opposite direction, at the end of the curve. The complete meander is passed over in a corresponding manner, until the end point 18 is reached.

However, it is necessary to match the paint amount to the respective speed for each of the different speeds in order to achieve a desired paint coating thickness at every point on the painted surface. This is one way to ensure that the paintwork has a uniform surface, and that an appropriate quality is therefore achieved. This means that, the higher the movement speed, the more paint can be fed by the painting application, in order to achieve a comparable mean coating thickness, in comparison to a slower speed with a correspondingly smaller paint amount.

Figure 2:
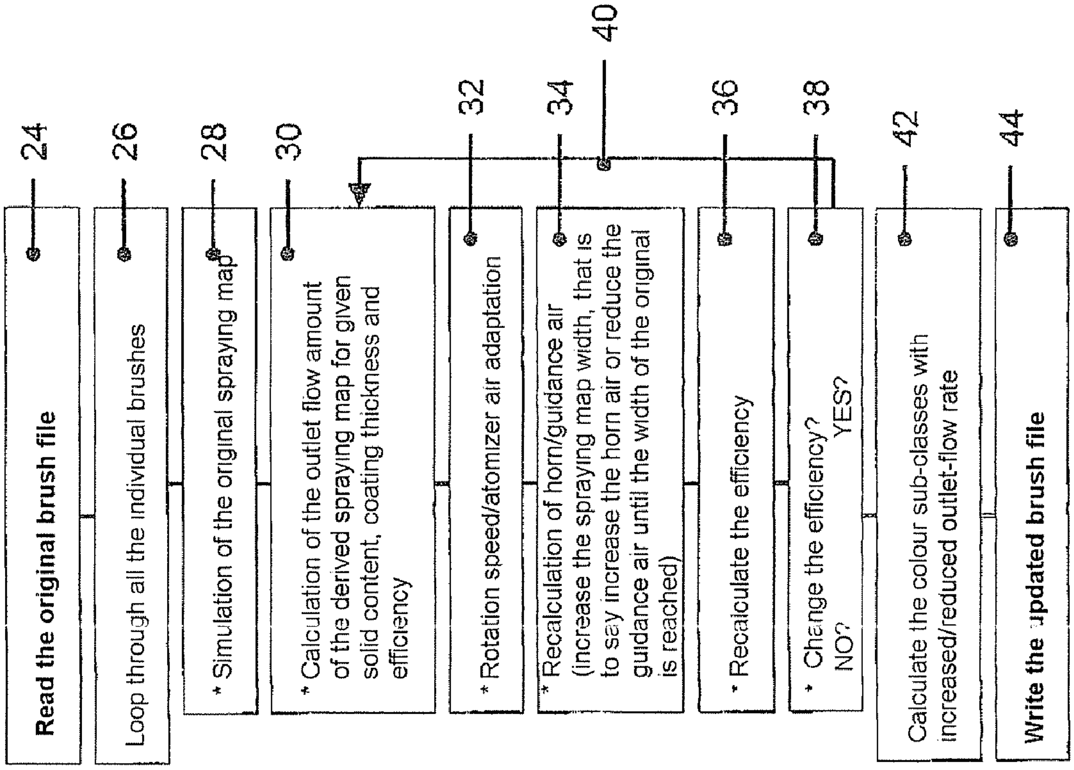
FIG. 2 shows a schematic method flowchart.

FIG. 2 shows an outline flowchart of the method according to the disclosure, by means of which the spraying parameters for controlling the spraying means for, example, the paint application can be determined in a particularly simple manner. First of all, the start conditions are defined for the method according to the disclosure for determination of spraying parameters. This is done by a first method step 24, in which fundamental data for the method is read from a so-called brush file. In this case, the file contains all of the spraying parameters that are significant for the painting process, in order to control a spraying means, in this case the paint. The brush file accordingly also defines all of the method data, such as the outlet flow rate, the paint colour, etc., so that the definition results in a specific spraying map using a painting appliance.

In a second method step 26, the subsequent method steps are carried out for each movement speed of the painting appliance until a determination criterion is reached.

First of all, a simulation of the original spraying map is produced in a third method step 28 for a specific movement speed, with the data associated with that movement speed being referred to as single brush. The original spraying map is that spraying map which results for a predetermined nominal speed and defined spraying parameters associated with this, such as the paint outlet flow rate, guidance air data etc. This spraying map is made available as a known spraying map with known spraying parameters for the further method run.

In a fourth method step 30, an outlet flow rate is now matched to a new movement speed, and a new spraying map is derived or calculated from this, with further constraints being applied, or being calculated subject to specific assumptions, such as the solid content, coating thickness or efficiency, etc.

In a fifth method step 32, the rotation speed or the atomizer air is adapted and calculated. In a sixth method step 34, the so-called horn air or guidance air is calculated. In this case, the horn air is used together with the atomizer air as a control variable for an air atomizer, and guidance air is used together with the rotation speed of the rotation atomizer. In this case, the spraying map width for the air atomizer is increased by increasing the horn air or, in the case of a rotary atomizer, by reducing the guidance air. This allows the width of the spraying map to be matched to that of the originally known spraying map.

In a further method, the seventh method step 36, the efficiency is calculated as a measure of the similarity of the original spraying map to the newly calculated spraying map in order, if necessary, to iteratively correct the assumed efficiency of the new spraying map. If sufficient similarity has not yet been achieved, or if the efficiency has changed, the method steps are repeated from the fourth method step 30, as is intended to be symbolized by the arrow 40, until adequate similarity is achieved between the spraying maps, and any differences in the efficiency are iteratively corrected.

So-called colour sub-classes can be calculated in this way in a ninth method step 42, with an increased or reduced outlet flow rate, as required. The method according to the disclosure results in a new data record for the so-called brush file being calculated in this way resulting in the production of a new spraying map, which is similar to the original spraying map, for the painting appliance, and being matched to the new outlet flow rate or the new movement speed of the painting appliance. This data is written to an updated brush file in a tenth method step 44. This results in spraying parameters being determined for controlling the painting appliance, and these can be used, for example, by the painting appliance.

Figure 3:
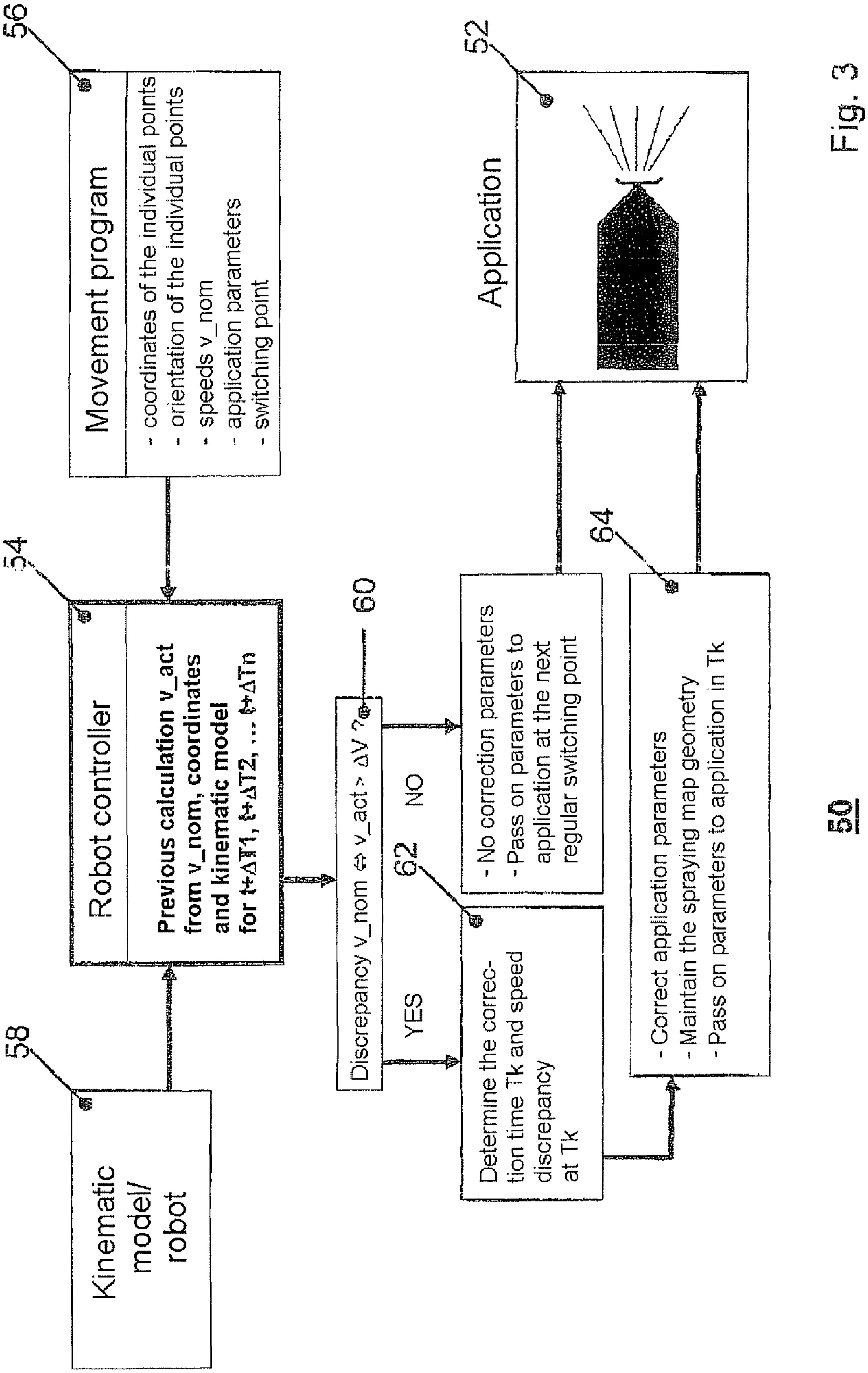
FIG. 3 shows a further flowchart of functional relationships for determination of spraying parameters.

FIG. 3 shows a further flow chart 50, indicating the data flow when the method according to the disclosure is applied to a painting robot with a painting application. The example chosen in this figure is based on a robot which has an application 52, for example a rotary atomizer with electrostatic charging. The robot has a robot controller 54 which contains as input data a movement program 56 which predetermines the coordinates of the individual points, the orientation of the individual points, a preset nominal speed as well as application parameters and switching points.

Furthermore, the robot controller 54 knows a kinematic model of the robot 58 by means of which, in the end, the previous calculation of the coordinates and the robot speed associated with the coordinates, in particular of each part of the robot arm, and the kinematic model for all future times on a movement path of the robot, can be calculated, or are known via the appropriate models. The preset nominal speed at each path point is a major variable in particular for painting tasks in conjunction with the method according to the disclosure.

This is because, if a comparison process 60 which compares the nominal speed at a path point with the actual speed of this path point indicates that a predetermined speed difference is exceeded, the method according to the disclosure is used in an appropriate method step 62 to determine the correction time Tk as well as the speed discrepancy (difference) at the time Tk. Specifically, the application parameter can then be corrected in a subsequent method step 64, while maintaining the spraying map geometry and with the parameters being passed on to the application at the time Tk. This results in the application 52 receiving a new instruction, which then corresponds to the new speed, at the time Tk, so that the spraying map geometry remains the same throughout the spraying process, even with the new, changed speed, thus making it possible to achieve a correspondingly high paintwork quality.

If the discrepancy between the nominal speed and the existing actual speed at the time Tk in the comparison process 60 is less than the permissible speed difference, the already known parameters for the application rows 50 are simply confirmed in an alternative method step 64, so that there is no need to correct these parameters. Either the parameters remain valid for the application beyond the time Tk, or an identical set of parameters is input to the application at the time Tk, so that, overall, these continue to operate in all cases with the known parameters. However, it is a normal data procedure, and has no significant influence on the method according to the disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| List of reference symbols | |
|---|---|
| 10 | Map |
| 12 | Different areas |
| 14 | Line |
| 16 | Start point |
| 18 | End point |
| 20 | Turning point |
| 22 | Flowchart |

-continued

| List of reference symbols | |
|---|---|
| 24 | First method step |
| 26 | Second method step |
| 28 | Third method step |
| 30 | Fourth method step |
| 32 | Fifth method step |
| 34 | Sixth method step |
| 36 | Seventh method step |
| 38 | Eighth method step |
| 40 | Arrow |
| 42 | Ninth method step |
| 44 | Tenth method step |
| 50 | Further flowchart |
| 52 | Application |
| 54 | Robot controller |
| 56 | Movement program |
| 58 | Kinematic model |
| 60 | Comparison |
| 62 | Method step |
| 64 | Subsequent step in the method |

What is claimed is:

1. Method for determining of spraying parameters for controlling a painting appliance which uses spraying means and is moved over an area to be painted, in particular a robot with a painting application, with a known spraying map being provided, with known spraying parameters and paint amounts for a predetermined movement speed of the painting appliance, with a paint amount being matched to a new movement speed in comparison to the predetermined movement speed, and with new spraying parameters being calculated for the adapted paint amount, while maintaining a spraying map which is similar to the known spraying map.

2. Method according to claim 1, wherein the movement speed or the change in speed is provided as a preset value for an actual speed for a robot controller.

3. Method according to claim 2, wherein a provisional spraying map is calculated on the basis of the known spraying map using the known spraying parameters and a new paint amount, in that the known spraying parameters are varied in order to obtain changed spraying parameters which result in a further spraying map, in that the changed spraying parameters are varied until the further spraying map is similar to the known spraying map within a similarity criterion, and in that the changed spraying parameters which are similar to the known spraying map are provided as new spraying parameters.

4. Method according to claim 1, wherein a provisional spraying map is calculated on the basis of the known spraying map using the known spraying parameters and a new paint amount, in that the known spraying parameters are varied in order to obtain changed spraying parameters which result in a further spraying map, in that the changed spraying parameters are varied until the further spraying map is similar to the known spraying map within a similarity criterion, and in that the changed spraying parameters which are similar to the known spraying map are provided as new spraying parameters.

5. Method according to claim 4, wherein the spraying parameters are suitable for controlling a plurality of air flows and influence the spraying behaviour of the painting appliance.

6. Method according to claim 1, wherein the spraying parameters are suitable for controlling a plurality of air flows and influence the spraying behaviour of the painting appliance.

7. The method as claimed in claim 6, wherein the known spraying parameters are used in the event of any discrepancies between the new movement speed and the predetermined movement speed which result in a provisional spraying map which is similar within the similarity criterion.

8. The method as claimed in claim 1, wherein the known spraying parameters are used in the event of any discrepancies between the new movement speed and the predetermined movement speed which result in a provisional spraying map which is similar within the similarity criterion.

9. Method according to claim 8, wherein the new spraying parameters are calculated during operation of the painting appliance and before the change to the predetermined movement speed.

10. Method according to claim 8, wherein the new spraying parameters are calculated before operation of the painting appliance.

11. Method according to claim 1, wherein the new spraying parameters are calculated during operation of the painting appliance and before the change to the predetermined movement speed.

12. Method according to claim 1, wherein the new spraying parameters are calculated before operation of the painting appliance.

13. Method according to claim 12, wherein the expected coating thickness distribution after a change is taken into account in the calculation of the new spraying parameters.

14. Method according to claim 1, wherein the expected coating thickness distribution after a change is taken into account in the calculation of the new spraying parameters.

15. Method according to claim 14, wherein the calculations are carried out by the robot controller or by a data processing installation which interacts with the robot controller.

16. Method according to claim 1, wherein the calculations are carried out by the robot controller or by a data processing installation which interacts with the robot controller.

17. Method according to claim 16, wherein new spraying parameters are in each case determined and stored for a number of speed ranges or speeds.

18. Method according to claim 1, wherein new spraying parameters are in each case determined and stored for a number of speed ranges or speeds.

19. A method for robotic control of a spray appliance which uses spraying means for a spraying application, comprising:

providing a known spraying map;

providing known spraying parameters and spray amounts for a predetermined movement speed of the spray appliance;

matching a variable spray amount to a varying movement speed in comparison to the predetermined movement speed; and calculating at least one variable spraying parameter based on the variable spray amount, while maintaining a mapped spraying path based on the known spraying map.

* * * * *